Nov. 23, 1926.  1,608,454
H. P. WOODS
HEADLIGHT
Filed April 5, 1926    2 Sheets-Sheet 1
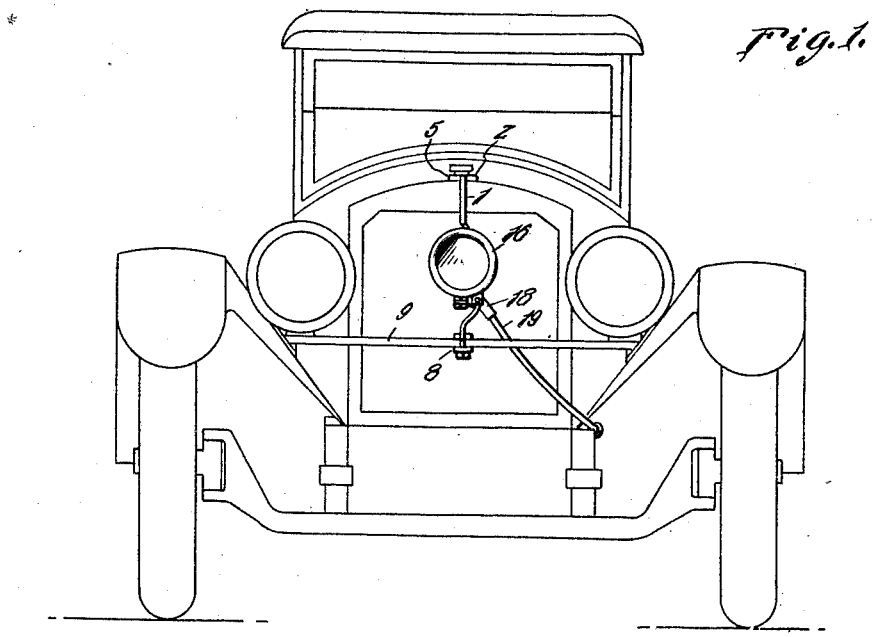
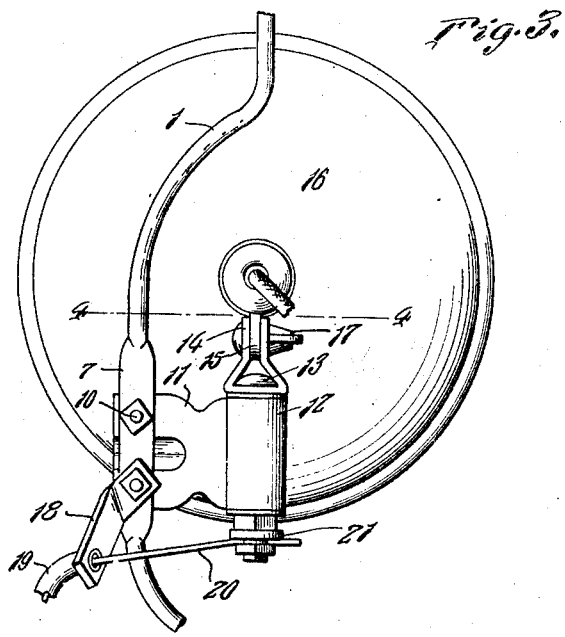
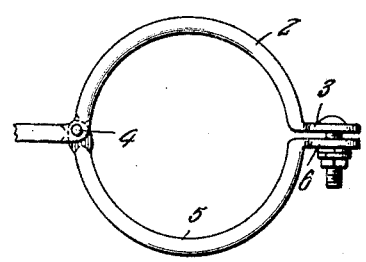
H. P. Woods
INVENTOR
BY Victor J. Evans
ATTORNEY Nov. 23, 1926.

H. P. WOODS 1,608,454

HEADLIGHT

Filed April 5, 1926     2 Sheets-Sheet 2

H. P. Woods
INVENTOR

BY Victor J. Evans
ATTORNEY

Patented Nov. 23, 1926.

1,608,454

UNITED STATES PATENT OFFICE.

HERMAN PARREN WOODS, OF CRAIG, COLORADO.

HEADLIGHT.

Application filed April 5, 1926. Serial No. 99,870.

My present invention has reference to a dirigible spot light for automobiles.

My object is the provision of a spot light for automobiles which is arranged at the front thereof between the headlamps, supported in a novel manner so that the same will move in the direction of the turning of the wheels and thereby direct brilliant rays of light ahead of the machine so that the driver can observe road conditions under all circumstances and particularly in climbing hills, making descents and making turns, with the result that accidents incident to the non-acquaintance of the driver with the road conditions ahead will be effectively prevented.

A still further object is the provision of a spotlight mounted in a novel manner whereby the same will turn in the direction of the turning of the front wheels of the machine, and which has its lamp circuit controlled by a switch which is at all times accessible to the driver of the machine.

To the attainment of the foregoing and other objects which will present themselves as the nature of the invention is better understood, the improvement further resides in certain novel features of construction, combination and operative association of parts, a satisfactory embodiment of which is illustrated by the accompanying drawings.

In the drawings:

Figure 1 is a front elevation of an automobile equipped with my improvement.

Figure 3 is a fragmentary rear elevation of the lamp housing to illustrate the mount therefor.

Figure 6 is a plan view of the split ring member for the support.

Figure 2:
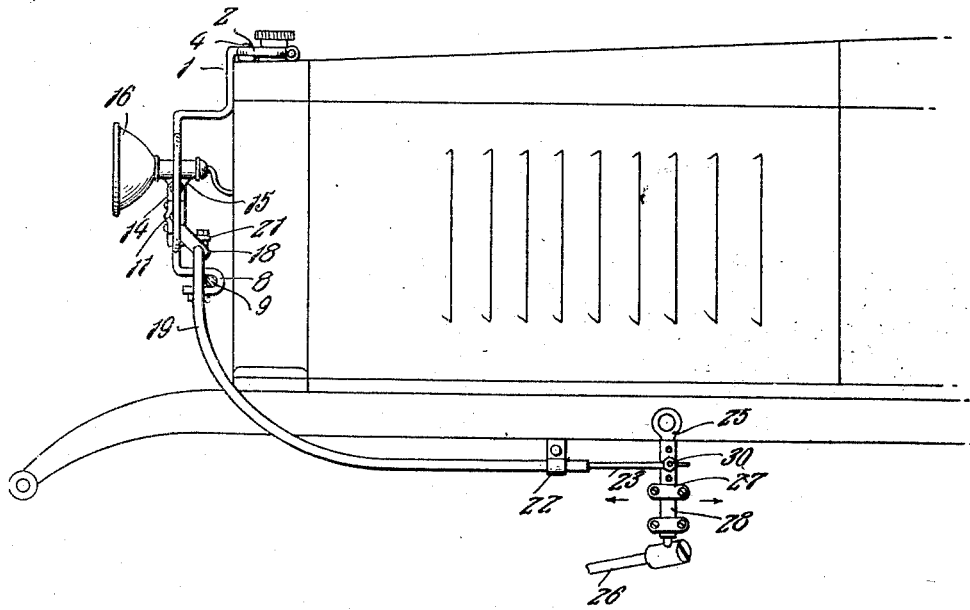
Figure 2 is an enlarged fragmentary side elevation thereof, with parts in section.
Figure 4:
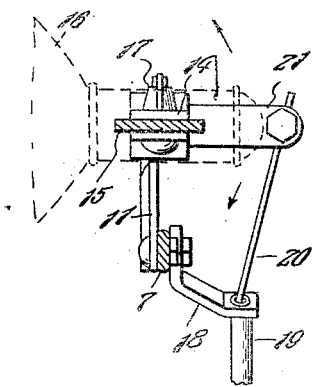
Figure 4 is a detail sectional view approximately on the line 4—4 of Figure 3.
Figure 5:
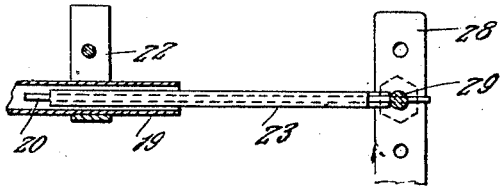
Figure 5 is a detail sectional view through a portion of the flexible housing for the pull wire and illustrating the manner in which one end thereof is connected to the bracket on the swinging arm actuated by the steering post and to which the steering rod is connected.

As disclosed by the drawings, I make use of a rod support which is indicated by the numeral 1. The rod has one of its ends bent to provide a semi-circular part 2, the end of which being formed with an ear extension 3. Pivoted, as at 4, to the rod, at the angle end thereof formed with the semi-circular extension 2, there is a half ring member 5 that has its free end formed with an ear extension 6. The elements 2 and 3 provide a split ring clamp, and this clamp is designed to be received around the filler spout for the radiator of the automobile, and the ears 6 have passed therethrough binding means, such as a bolt which is engaged by nuts. The ring, as inferred, is formed at a right angle with respect to the longitudinal plane of the rod 1, and the said rod at a suitable point throughout its length is rounded upon itself and is flattened, as at 7. From the flattened portion the rod is rounded inwardly and is directed downwardly and this extension is inturned and is from thence formed with a hooked portion 8 that is designed to receive therein the brace rod 9 for the fenders of the automobile. Suitable binding means, such as a nut and bolt pass through the parallel elements of the hook 8 and contact with the outer edge of the brace rod 9. In this manner it will be noted that the rod, which provides the main support of the spot light, is effectively secured on the front of the automobile.

Fixed by removable means 10 on the flat portion 7 of the rod there is a bracket 11. This bracket has its outer end formed with a barrel 12 and passed through this barrel there is a pivot member 13. The pivot has its upper end headed, the said head resting on the straight inner portion of a split spring clamp 14. The clamp receives between the arms thereof an ear 15 formed on the housing 16 for the spot light, while suitable binding means, such as a bolt which is engaged by a wing nut 17, holds the spot light adjusted on the clamp.

The bulb in the spot light is wired to the electric circuit of the automobile, and the spot light circuit is controlled by a suitable switch (not shown), that is arranged readily accessible to the driver of the automobile.

On the flat portion 7 of the rod 1, and secured thereto by one of the elements 10, there is an angle arm 18, and to one side of this arm there is secured one end of a tube 19. There is passed through this tube and through the arm 18 a stiff wire cable 20, the said cable having one end secured to an arm 21 that extends angularly from but is fixed to the pivot 13. The flexible pipe or housing 19 is directed toward the rear of the automobile, and is supported by one or more brackets 22 that are fixed on the bottom of the automobile. The tubular housing 19, at the outer end thereof, has preferably received therein a smaller tube 23 through which the wire member or shaft 20 passes.

The numeral 24 designates the swingable arm that is actuated by the steering rod of the automobile and to which arm there is swivelly connected the steering connecting rod 26. On the arm 24 I secure by clamps 27 a plate 28. This plate has any desired number of spaced openings therethrough. Through one of these openings there is passed a bolt 29 whose shank is slotted and through this slot there is received the end of the wire or flexible shaft 20. The bolt 29 is engaged by a nut 30 which firmly clamps the flexible shaft on the plate 28.

The simplicity of my improvement and the advantages thereof, will, it is thought, be perfectly apparent to those skilled in the art to which such invention relates, when the foregoing description has been carefully read in connection with the accompanying drawings. It will be noted that the spot light is dirigibly supported and while not disclosed by the drawings the circuit for the electric bulb therein, as stated, is under ready control of the driver of the machine. The lamp housing may be adjusted at any desired angle on its support and as rays of light from the housing will be projected for a greater distance than those from the headlamps it will be apparent that all road conditions ahead of the vehicle may be readily observed by the driver and accidents which frequently occur from ignorance of such conditions will be effectively overcome.

Having described the invention, I claim:—

1. The combination with a vehicle provided with steering mechanism and with the usual headlamps as well as the brace rod for the front fenders, of a rod removably but fixedly supported on the brace rod and from the top of the radiator for the automobile, a bracket on said rod, a pivot passing through the bracket, a spot light housing, means adjustably securing the housing to the pivot, an angle arm on the pivot, a flexible shaft secured to said arm, guide means for the shaft and said shaft being fixed to the steering mechanism of the automobile and operated thereby.

2. The combination with an automobile having the usual radiator, the headlamps, the brace rod for the front fenders and the steering mechanism for the front wheels, of a rod, having both of its ends offset, one of which being hooked to engage the brace rod, means securing said hook on said brace rod, a split ring associated with the second end of the rod and designed to be clamped around the pouring spout for the radiator, a bracket fixed on the rod centrally with respect to the headlamps, a pivot journaled through said bracket, a clamp carried by the pivot, a spot light having its housing pivotally and swingably secured to the clamp, said pivot having an angle end, a wire shaft secured to said element, a flexible guide housing for the shaft having one end supported from but angularly with respect to the rod, brackets supporting the second end of the clamp from the body of the automobile, a plate fixedly secured to the swingable arm of the steering mechanism of the automobile, and adjustable means for securing the second end of the shaft to said plate.

In testimony whereof I affix my signature.

HERMAN PARREN WOODS.